(12) United States Patent
Lewis et al.

(10) Patent No.: US 6,297,736 B1
(45) Date of Patent: Oct. 2, 2001

(54) LOCATING CONCEALED CONDUCTORS

(75) Inventors: Andrew Biggerstaff Lewis, Bristol; Nicholas James Frost, Somerset, both of (GB)

(73) Assignee: Radiodetection Limited, Bristol (GB)

( * ) Notice: Subject to any disclaimer, the term of this patent is extended or adjusted under 35 U.S.C. 154(b) by 0 days.

(21) Appl. No.: 09/462,063

(22) PCT Filed: Jul. 16, 1998

(86) PCT No.: PCT/GB98/02131

§ 371 Date: Dec. 30, 1999

§ 102(e) Date: Dec. 30, 1999

(87) PCT Pub. No.: WO99/04294

PCT Pub. Date: Jan. 28, 1999

(30) Foreign Application Priority Data

Jul. 16, 1997 (GB) ................................... 9714968

(51) Int. Cl.$^7$ .................................................. G08B 13/24
(52) U.S. Cl. ........................ 340/551; 340/552; 324/326
(58) Field of Search ..................... 340/551, 561, 340/567, 552; 324/67, 326, 327, 335

(56) References Cited

U.S. PATENT DOCUMENTS

| | | | |
|---|---|---|---|
| 1,718,352 | 6/1929 | Guilford | 324/335 |
| 1,766,378 | 6/1930 | Guilford | 324/334 |
| 4,639,674 * | 1/1987 | Rippingale | 324/326 |
| 5,093,622 * | 3/1992 | Balkman | 324/326 |
| 5,425,367 * | 6/1995 | Shapiro et al. | 324/326 |
| 5,438,266 * | 8/1995 | Tsang | 324/326 |
| 5,773,971 * | 6/1998 | Tavernetti | 324/67 |

FOREIGN PATENT DOCUMENTS

| | | |
|---|---|---|
| 251429 | 5/1926 | (GB) . |
| 2175096A | 5/1986 | (GB) . |

OTHER PUBLICATIONS

E.B. Glennie, Inductive Detection of Underground Metallic Pipes Proc. IEE, vol. 122, No. 4, Apr. 1975, pp. 345–348.

J.C. Lim, Synthesis of a Single Null Response in an otherwise Omnidirectional Pattern using a Circular Array, Proc. IEE, vol. 122, No. 4, Apr. 1975, pp. 343–344.

* cited by examiner

Primary Examiner—Van T. Trieu
(74) Attorney, Agent, or Firm—Woodbridge & Associates, P.C.; Richard C. Woodbridge

(57) ABSTRACT

A method of locating a concealed conductor is performed by generating a magnetic field with a direction in which the field is a maximum. The magnetic field is rotated until that direction is directed towards the conductor. In this way, a signal is induced in the conductor which has a maximum value when that direction is directed towards the conductor. The induced signal is detected in the conductor, using a detector arranged to determine the direction of the conductor relative to the detector. The detector detects when the induced signal has the maximum value.

19 Claims, 2 Drawing Sheets

LOCATING CONCEALED CONDUCTORS

BACKGROUND OF THE INVENTION

1. Field of the Invention

The present invention relates to the location of a concealed conductor, such as an underground cable or pipe.

2. Summary of the Prior Art

It is well known to detect the path (ie, to locate) a buried cable by applying a recognizable signal to that cable, and detecting the magnetic fields generated by the signal on the cable at remote sites. Such techniques are very well known, and widely used, but all depend on access to the cable at some point to apply the signal thereto. This may not always be possible, particularly when the people carrying out the locating are not employees of the utility to whom the cable belongs. Of course, an electrical cable carrying an alternating mains current will itself generate a magnetic field, which can be detected, but it is impossible to distinguish the field thus generated by one cable from that generated by another. It is therefore not usually possible to use the mains current as a way of locating a specific cable.

If an alternating magnetic field is generated at a particular site, that will induce a current on the cable which can be detected at a remote site due to the magnetic field which the current generates in the cable. Therefore, it is possible to induce a current on a cable without having direct access thereto, and subsequently to detect that cable. However, there are often many cables or metal pipes within range of an induction source and signals will be generated on all those simultaneously, so that detection at a remote site cannot identify which cable or pipe is being detected. It is thus not possible to trace the path of a specific cable or metal pipe. For simplicity, the subsequent discussions will use the term "cable" to refer to the concealed conductor. However, the invention is not limited to the detection of cables, but also metal pipes or other concealed conductors.

SUMMARY OF THE INVENTION

The present invention arises from the realisation that a rotating induction field will induce peak signals on different cables at different times, in dependence on the rotation of the field. It is further possible to detect the origin of a magnetic field using an appropriate detector such as a pair of perpendicular coils. Thus, if the preferred direction of detection is rotated in synchronism with the rotation of the induction field, it is possible to identify one cable out of a group of cables.

Although it is possible to generate a rotating induction field by rotating a single coil, it is preferable to use at least one pair of crossed coils, and vary the currents thereto in quadrature. In a further development of this, two pairs of crossed coils are used, with the parallel coils of each pair being proximate and generating fields in anti-parallel. With such an arrangement, the fields from the parallel coils cancel each other in one direction, and reinforce each other in another. If the detector coils are then located in the direction in which the fields cancel, there will be no direct coupling from the transmitter (ie, the coils generating the induction field) to the receiver (the coils detecting the induced current).

The above discussion assumes that there is a single rotating induction field. Whilst this can distinguish cables at different positions around the point of rotation, it cannot distinguish cables which lie in the same direction from the point of rotation of the field, but at different distances.

However, if two induction field sources are used, the two fields can be rotated so that the point at which the maxima of the two fields coincide is known from the spacing of the two sources, and the directions of the maxima. The point of coincidence can be moved by rotating one or both or the fields. Thus, the point of coincidence maxima can be caused (by rotation of either or both of the fields) to map-out an area perpendicular to the axes of rotation (this assumes that the fields rotate about parallel axes). If a cable is located at a point of coincidence of the maxima, as the maxima map-out the area, corresponding signals will be induced on the cable. Thus, signals can be induced on different cables at different times, irrespective of the position of the cables relative to the sources of the induction fields. When the rotating fields move, they can be thought of as mapping out a grid, so that the position of a given cable within that grid can be identified.

In practice, if coils are used to define the induction fields, the minima of such fields are defined more sharply than the maxima. Therefore, once an initial identification of the location of a cable has been identified, by observing induction at the location of the maximum (or maxima) of the induction field(s), it is preferable subsequently to investigate minima, as this then enables the location of the previously detected cable to be identified more precisely.

In practice, the alternating current on a cable, even when a mains current, exhibits not only the principal frequency of the alternating current but also other frequencies. It has been found that the frequency spectrum varies from cable to cable even when all the cables are carrying mains current. The most usual variation is that a cable will exhibit frequency gaps and these frequency gaps are not always the same for all cables.

The spectrum of frequencies of the current on the cable generates a corresponding spectrum in the magnetic field generated by the current in the cable. Thus, by obtaining a spectrum of the vertical field from each cable, and investigating anomalies in the spectrum, such as gaps in the frequencies, it is possible to identify the cable. This arrangement may be used in combination with the cable location arrangement described previously, but is an independent aspect of the present invention.

BRIEF DESCRIPTION OF THE DRAWINGS

Embodiments of the present invention will now be described in detail, by way of example, with reference to the accompanying drawings, in which.

DETAILED DESCRIPTION

Figure 1:
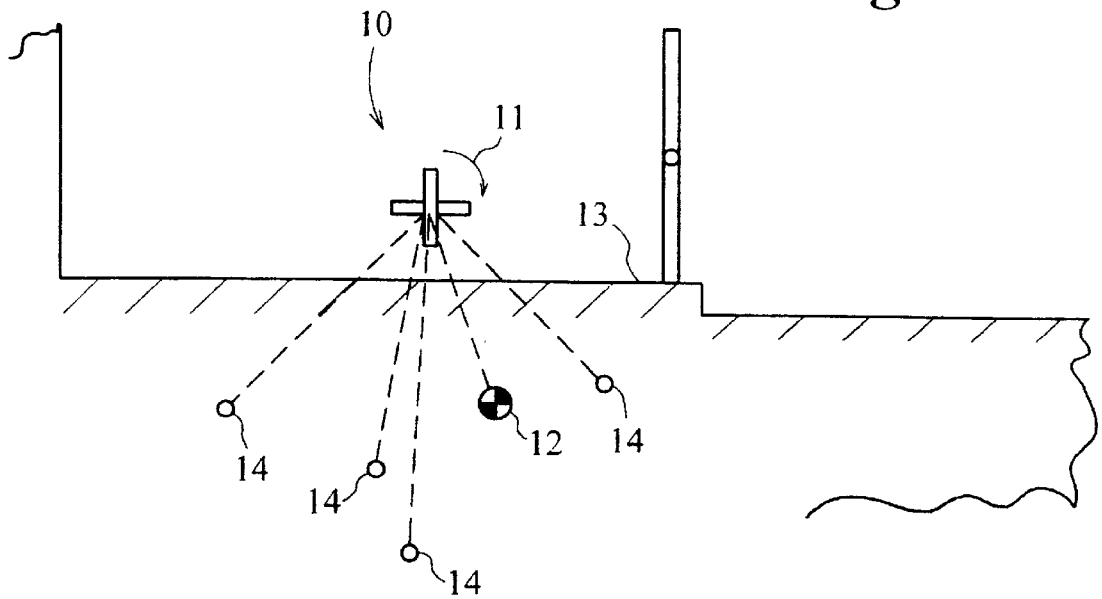
FIG. 1 is a schematic diagram showing the principles underlying the present invention.

Referring first to FIG. 1, consider a pair of crossed (ie, perpendicular) coils 10. If alternating currents are applied thereto, a magnetic field will be generated. By suitable adjustment of the currents in the coils 10, that field can be arranged to have a direction of maximum intensity. Suppose now that coils 10 are rotated in the direction of arrow 11. The direction of maximum intensity will thus also rotate. Thus, at some point in rotation in the coils, the direction of maximum intensity will be directed towards one underground cable 12 which is buried below the ground surface 13. Coupling to other cables 14 will be less. However, if the coils 10 rotate, the maximum coupling will pass from the cable 12 successively to the other cables 14.

The above description assumes that the coils 10 are rotating in the direction of arrow 11. However, by varying the currents to the coils 10 in quadrature, the direction of maximum field intensity may be caused to rotate without physical movement of the coils 10. The same effect of successive maximum coupling to the cables 12, 14 will occur.

Suppose now that the coils 10 are used to detect magnetic fields due to currents in the cables 12, 14 which have been induced by a rotating induction field as previously described. When the maximum of the induction field is aligned with cable 12, the induced current in that cable 12 will be a maximum. If there is a fixed relationship between the coils which generate the induction field (transmitter coils) and the coils which detect the magnetic fields in the cables 12, 14 (receiver coils), then the receiver coils will detect the field from the cable 12 and, due to the fact that the coils 10 are crossed, will be able to identify the direction of that field. Thus, by synchronizing the direction of maximum induction field and detection direction, and by rotating both, it is possible to identify separately each of the cables 12, 14.

Of course, since the induction field does not have a sharp maximum, currents will be induced into others of the cables 14, even when the maximum is directed towards cable 12. Thus, at the detector, some signals will be detected from those cables 14. However, since those signals will be significantly less than when the maximum of the induced field is directed towards the corresponding cable 14, it is possible to recognise when the induction corresponds to a maximum, and when it does not, so that the appropriate cable 12, 14 can still be identified unambiguously.

Figure 2:
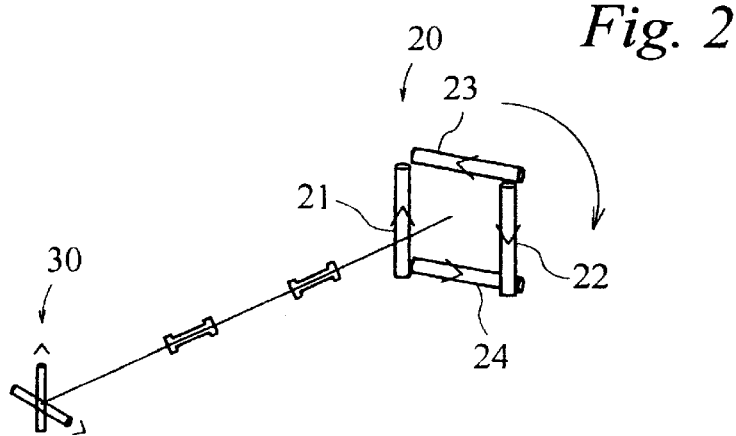
FIG. 2 is a schematic view of the principal components of a conductor location device embodying the present invention.

FIG. 2 shows an embodiment for achieving such an arrangement. In FIG. 2, the transmitter coils 20 comprise two pairs of parallel coils 21, 22 with the coils of the two pairs being perpendicular. The coils of each pair have currents applied thereto in opposite directions, as shown by the arrows on the coils 21 to 24. The reason for this is that the magnetic fields generated by the coils of each pair will then reinforce each other in directions in the plane defined by the coils 21 to 24, but will cancel each other out in directions perpendicular to that plane. Thus, at the detector coils 30, the field from coil 21 will be cancelled by the field from coil 22, and the field from coil 23 will be cancelled by the field from coil 24. There will thus be no direct coupling between the transmitter coils 20 and the receiver coils 30.

The device of FIG. 2 is then positioned over an area where cables are to be located. The fields due to the transmitter coils 21 to 24 are then rotated, either by physically rotating the coils 21 to 24 or by varying the currents therein in quadrature as previously described, and thus there will be induction of currents in cables below the device as has previously been described with reference to FIG. 1. The magnetic fields generated by those induced currents can then be detected by the detector coils 30.

Figure 3:
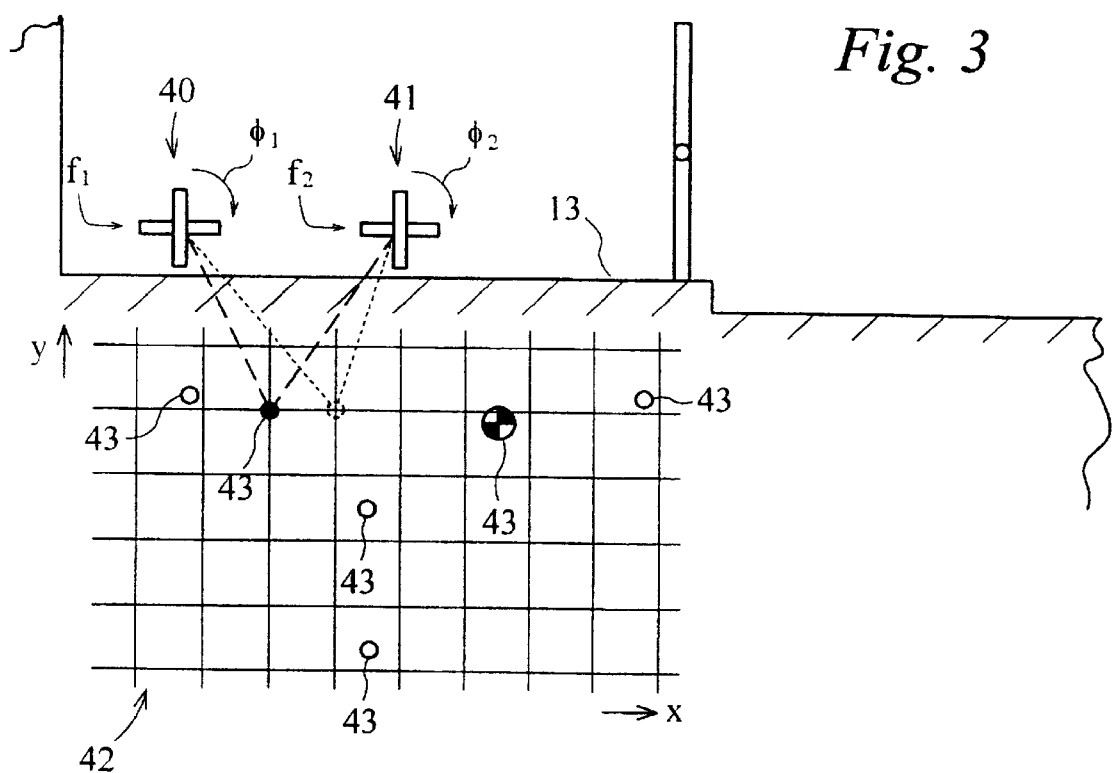
FIG. 3 illustrates the principles underlying another embodiment of the present invention.

One problem with the embodiments described with reference to FIGS. 1 and 2 is that it is not possible to distinguish between two cables which lie in the same direction from the transmitter coils. Whilst the magnitude of the current induced in those two coils will be different, due to their different distances from the transmitter coils, the maxima induced in those coils will occur at the same time. The arrangement shown in FIG. 3 seeks to overcome this problem, and proposes that there are two sets of transmitter coils 40, 41, each of which generates a field which is rotatable as described with reference to FIG. 1. Although FIG. 3 shows arrangements in which the sets of transmitter coils 40, 41 each comprise a crossed pair of coils, as in FIG. 1, the arrangement of transmitter coils 21 to 24 shown in FIG. 2 may also be used for each of the transmitters 40, 41.

Each coil 40, 41 has, at any time, a line extending therefrom corresponding to the line of the maximum field intensity, and, except in the case where those lines are parallel, they will intercept at some point. By rotating the fields to suitable angles relative to each vertical, the point of intersection can be changed. If the angle $\phi_1$ and $\phi_2$ of the maximum field intensities are known, and the separation of the coils 40, 41 is known, the point of intersection can be determined. If the point of intersection coincides with a cable, a signal will be induced in the cable by both fields and this can be detected as has previously been described.

At any time, there will be only one point at which the maxima of each of the fields from the two sets of transmitter coils 40, 41 coincide. As the fields are rotated, that point will move below the surface 13 above which the sets of transmitter coils 40, 41 are located. The result is that the point of intersection of the maxima can be considered to scan out a grid 42 below the sets of transmitter coils 40, 41. Thus, signals can be induced in cables 43 below the ground 13 at different times. A similar set of detector coils corresponding to the sets of transmitter coils 40, 41 can be used which similarly scans an area to detect specific cables.

In practice, it is preferable that the frequencies $F_1$ and $F_2$ of the transmitter coils 40, 41 are different.

It may then be possible to plot a transfer function against frequency for each position in the grid 42, which may enable different types of cables to be identified.

In such an arrangement, the alignment of the transmitter and receiver coils must be maintained accurately. If they are not to be physically interconnected (and the optimum spacing of the transmitter and receiver coils may prevent this or at least make the device excessively unwieldy, some other positioning system is required, such as an optical system.

In the above discussion, cables are detected when they are aligned with the maximum (or maxima in the case of the embodiment of FIG. 3) of the induction field(s). However, the maxima are not sharp and thus the accuracy of location is not high. The minima of the fields are much sharper, but such minima cannot be used initially to locate the cables since they generate no induction. However, if the cables are first pre-located by observing maxima, and then the general location of each cable thus identified is investigated using the minima of the field, to detect the position of the field at which there is no coupling, a more accurate determination of the cable location can be obtained.

As has previously been mentioned, a cable carrying an alternating current generates a magnetic field with a spectrum of frequencies, and that spectrum may contain anomalies, such as gaps, which can be identified by e.g. the detector coils 30 and a suitable processor for processing the signals generated in the coils 30. By investigating the gaps in the spectra from the different cables, it is further possible to distinguish different cables in terms of those gaps and so identify the path of the cable. Such identification is not wholly reliable, since it depends on the gaps in the field spectra, and it is not impossible for two cables to have the same gaps. However, in most cases, such investigation of spectral anomalies, such as gaps, is sufficiently reliable, particularly when the general area of the cable has already been located, so that the path of the cable can then be followed using a location based solely on the spectral gaps of a cable which has already been identified.

What is claimed is:

1. A method of locating a concealed conductor comprising:

generating a magnetic field having a direction in which the field is a maximum; said magnetic field being generated by generating a plurality of sub-fields, the maximum of said sub-fields having different directions, said sub-fields being combined to form said magnetic field;

rotating the magnetic field until said direction is directed towards the conductor, thereby to induce a signal in the conductor which has a maximum value when said direction is directed towards the conductor, said magnetic field being rotated by varying said sub-fields; and detecting the induced signal in the conductor with a detector arranged to determine the direction of the conductor relative to the detector, the detector detecting when said induced signal has the maximum value.

2. A method according to claim 1 wherein the detector is rotated in synchronism with the rotation of the said magnetic field.

3. A method according to claim 1 having two generating means, the two generating means being spaced apart, whereby said magnetic field has a local maximum at a predetermined point, and the magnetic field being rotated until the predetermined point is coincident with the conductor.

4. A method according to claim 3, wherein the two generating means operate at different frequencies.

5. A method according to claim 1, wherein the magnetic field has a second direction in which the field has a minim value, the field is rotated until the second direction is directed towards the conductor, the detector determining when the induced signal has a minim value.

6. An apparatus for locating a concealed conductor, comprising:

means for generating a magnetic field having a direction in which the field is a maximum, said generating means comprising a transmitter for generating a plurality of sub-fields, the maximum of said sub-fields having different directions, said sub-fields being combined to form said magnetic field, said transmitter being arranged to vary said sub-fields, thereby to rotate said direction and to permit said direction to be directed towards said conductor; and a detector for detecting a signal induced in the conductor due to said magnetic field, the detector being adapted to determine the direction of the conductor relative to the detector and to detect when the induced signal has a maximum value.

7. A method of locating a concealed conductor comprising:

generating a magnetic field having a direction in which the field is a maximum, said magnetic field being generated by a transmitter comprising first and second pairs of coils, the coils of each pair being parallel over the coils of the first pair being perpendicular to the coils of the second pair, the step of generating of the magnetic field comprising applying currents to said first and second pairs of coils such that the coils of each par have said currents applied thereto in opposite directions;

rotating the magnetic field until said direction is directed towards the conductor, thereby to induce a signal in the conductor which has a maximum value when said direction is directed towards the conductor, said magnetic field being rotated by varying said sub-fields; and detecting the induced signal in the conductor with a detector arranged to determine the direction of the conductor relative to the detector, the detector detecting when said induced signal has the maximum value.

8. A method according to claim 7, wherein said transmitter is rotated to rotate the field.

9. A method according to claim 7, wherein the detector is rotate in synchronism with the rotation of the magnetic field.

10. A method according to claim 7, wherein the currents in said pairs of coils are varied, thereby to rotate said magnetic field.

11. An apparatus for locating a concealed conductor, comprising:

a transmitter means for generating a magnetic field having a direction in which the field is a maximum, the generating means being arranged to rotate said direction thereby to permit said direction to be directed towards the conductor, said generating means comprising a transmitter comprising first and second pair of coils, the coils of each pair being parallel over the coils of the first pair being perpendicular to the coils of the second par, said generating means being arranged to apply currents to said first and second pairs of coils such that the coils of each pair have said currents applied thereto in opposite directions;

a detector for detecting a signal induced in the conductor due to determine the direction of the conductor relative to the detector and to detect when the induced signal has a maximum value.

12. A method of locating a concealed conductor comprising:

generating a first and second magnetic fields each having a direction in which the corresponding field is a maximum whereby the resultant field of said first and second magnetic fields being a local maximum at a point;

rotating each of said first and second magnetic fields until said point is coincident with said conductor, thereby to induce a signal in the conductor which has a maximum value when said directions are directed towards the conductor; and detecting the induced signal in the conductor with a detector arranged to determine the location of the conductor relative to the detector, the detector detecting when said induced signal has a maximum value.

13. A method according to claim 12, wherein each of said first and second magnetic fields comprises sub-fields having different directions of maxima, which sub-fields are combined to form each of said first and second magnetic fields, the sub-fields being varied to rotate the first and second magnetic fields.

14. A method according to claim 12, wherein said first and second fields are generated by first and second transmitters respectively, and said first and second transmitters are rotated to rotate said first and second fields.

15. A method according to claim 12, wherein said first and second fields have different frequencies.

16. A method according to claim 12, wherein each of said first and second magnetic fields has a minimum value whereby the resultant field of said first and second magnetic fields has a local minimum at a forth point, the first and second fields being rotated until said further point is coincident with said conductor.

17. An apparatus for generating first and second magnetic fields each having a direction in which the corresponding field is a maximum, whereby the resultant field of said first and second magnetic fields being a local maximum at a point the generating means being arranged to rotate each of said first and second magnetic fields until said point is coincident with said conductor; and a detector for detecting a signal induced in the conductor due to said magnetic field, the detector being adapted to determine the direction of the conductor relative to the detector to detect when the induced signal has a maximum value.

18. An apparatus for locating a concealed conductor, comprising:

a transmitter for generating a magnetic field having a direction in which the field is a maximum, the generating means being adapted to rotate said direction thereby to permit said direction to be directed towards the conductor; and a detector for detecting a signal induced in the conductor due to said magnetic field, the detector being adapted to determine the direction of the conductor relative to the detector and to detect when the induced signal has a maximum value, wherein said generating means and said detector are physically interconnected thereby to maintain said generating means and said detector is a predetermined alignment.

19. An apparatus according to claim 18, wherein said transmitter comprises a transmitter comprising first and second pairs of coils, the coils of each pair being parallel over the coils of the first par being perpendicular to the coils of the second pair and said transmitter is arranged to apply currents to said first and second pairs of coils such that the coils of each pair have said currents applied thereto in opposite directions.

* * * * *